J. B. NOYES.
KNOCKDOWN CRATE.
APPLICATION FILED OCT. 1, 1907.

928,471.

Patented July 20, 1909.
3 SHEETS—SHEET 1.

Witnesses

Inventor
John B. Noyes
By Woodward Chandler
Attorneys

J. B. NOYES.
KNOCKDOWN CRATE.
APPLICATION FILED OCT. 1, 1907.

928,471.

Patented July 20, 1909.
3 SHEETS—SHEET 2.

Witnesses
Geo. L. Thorn
James A. Loebl

Inventor
John B. Noyes.

By Woodward & Chandler
Attorneys

J. B. NOYES.
KNOCKDOWN CRATE.
APPLICATION FILED OCT. 1, 1907.
928,471.
Patented July 20, 1909.
3 SHEETS—SHEET 3.
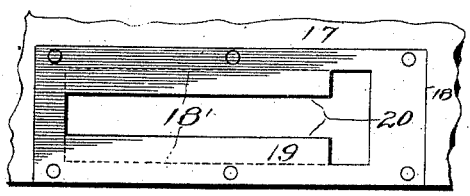
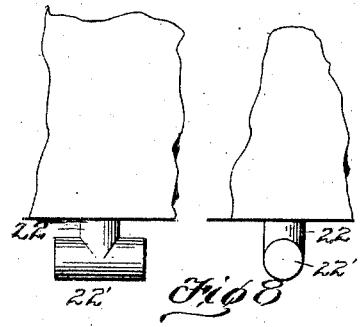
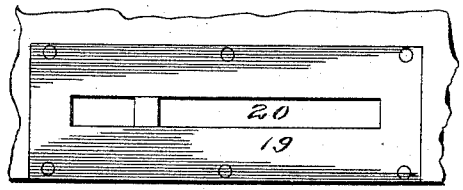
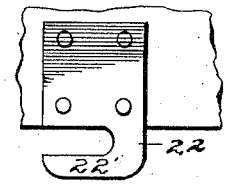
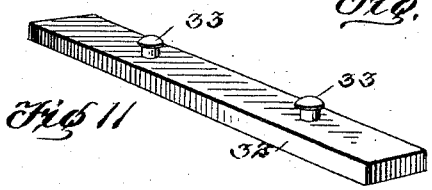
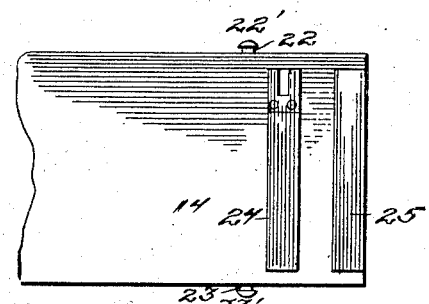
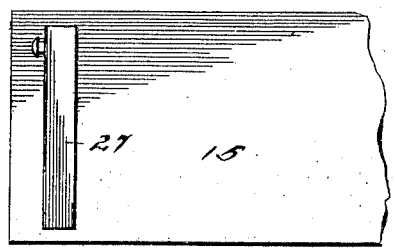
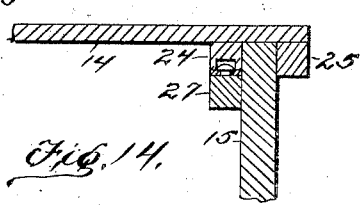
Inventor
John B. Noyes.
Witnesses
By
Attorney

UNITED STATES PATENT OFFICE.

JOHN B. NOYES, OF ST. LOUIS, MISSOURI.

KNOCKDOWN CRATE.

No. 928,471.      Specification of Letters Patent.      Patented July 20, 1909.

Application filed October 1, 1907. Serial No. 395,462.

*To all whom it may concern:*

Be it known that I, JOHN B. NOYES, a citizen of the United States, residing at St. Louis, in the county of St. Louis City and State of Missouri, have invented certain new and useful Improvements in Knockdown Crates, of which the following is a specification.

This invention relates to wooden receptacles, and more particularly to knock-down crates, and has for its object the provision of a crate capable of being packed in small space during its return shipment, and which may then be used again by shippers.

Other objects and advantages will be apparent from the following description and it will be understood that changes in the specific structure shown and described may be made within the scope of the claim without departing from the spirit of the invention.

Figure 1:
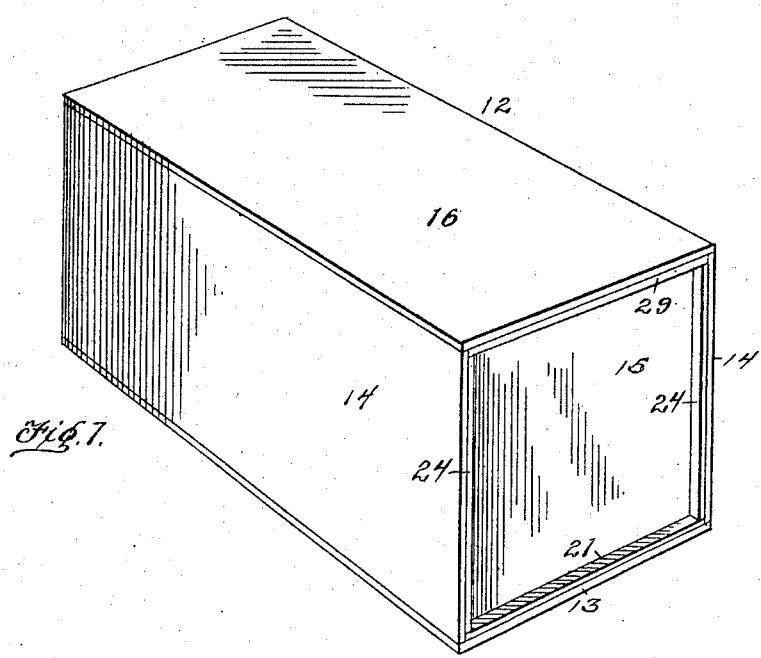
Figure 2:
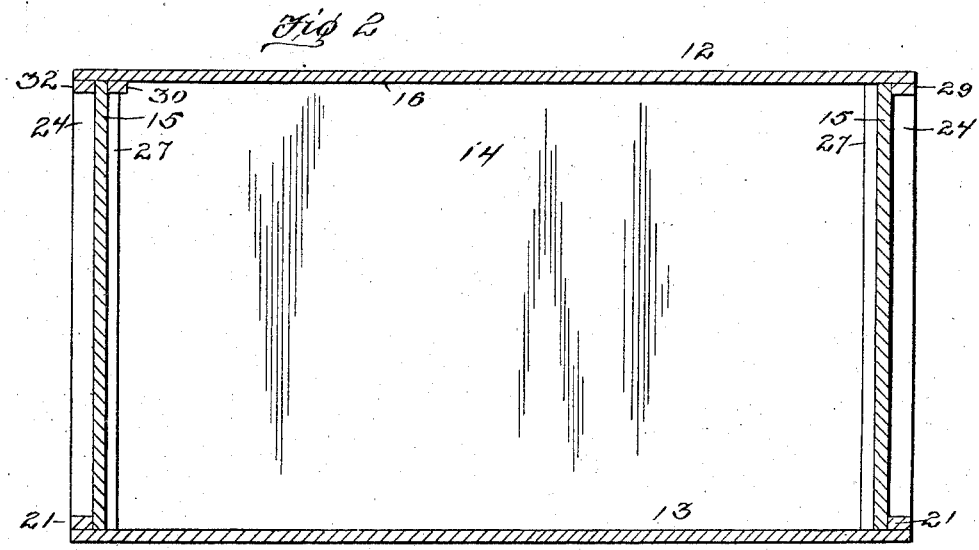
Figure 3:
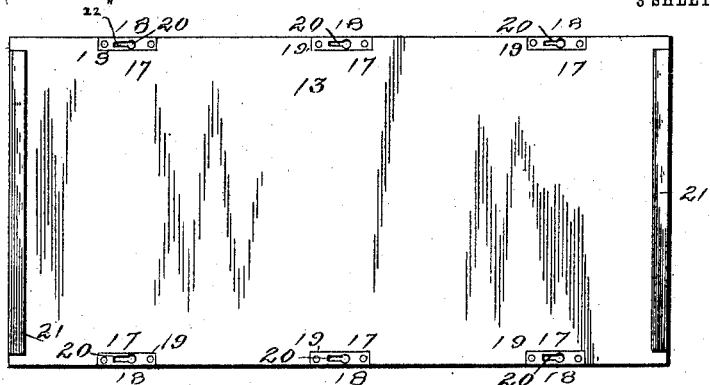
Figure 4:
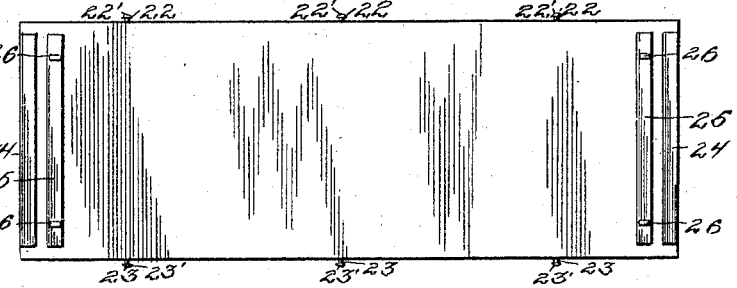
Figure 5:
Figure 6:
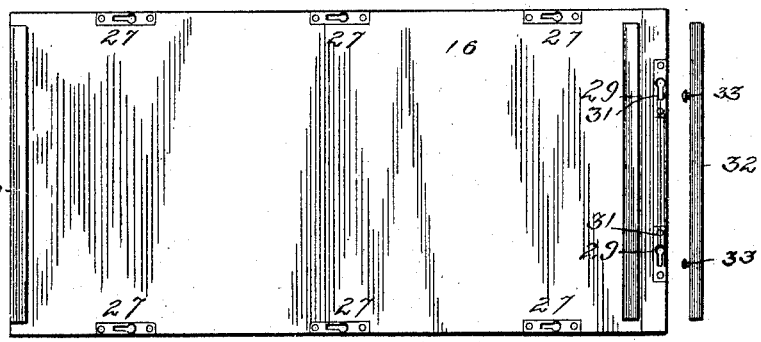

In the drawings forming a portion of this specification, and in which like numerals of reference indicate similar parts in the several views, Figure 1 is a perspective view of the crate; Fig. 2 is a vertical longitudinal section; Fig. 3 is a top plan view of the bottom section; Fig. 4 is an inner face view of one of the side members; Fig. 5 is a similar view of one of the end members; Fig. 6 is a similar view of the top member; Fig. 7 is a detail view of a modified form of locking plate; Fig. 8 is a detail view of a modified form of locking member; Fig. 9 is a detail view of a further modified form of locking plate; Fig. 10 is a detail view of a further modified form of locking member; Fig. 11 is a detail perspective view of a locking cleat; Fig. 12 is an inside view of one of the side members showing a modified form of the locking means for the end members; Fig. 13 is a similar view of one of the end members showing a modified form of locking means for co-engagement with the locking means shown in Fig. 12; Fig. 14 is a horizontal section view of the form of fastening shown in Figs. 12 and 13.

Referring now more particularly to the drawings, there is shown a crate 12, and this crate consists of a bottom member 13, the connecting side members 14, the connecting end members 15, and a top member or lid 16. The bottom member 13 is recessed adjacent its front and rear edges, as shown at 17, and these recesses are cut away as at 18, to form seats, for the reception of locking plates 19. The locking plates are provided with key hole slots 20 as shown. Cleats 21 are shown on the ends of the bottom member 13, for a purpose to be hereinafter described. The side members 14, carry pins 22 and 23 respectively at their upper and lower edges, and these pins are headed, as shown at 22′ and 23′. The heads 22′ of the pins 22 are thus arranged to register with the laterally engaged end portions 20′ of the slots 20, and the pins 22 are thus arranged for sliding movement in the slots 17 to allow the heads 22 thereof to seat themselves beneath the plates 19 with a portion of the heads at either side of the elongated portion 20″ of the slots 20.

Each of the side members 14 carries a pair of cleats 24 and 25 respectively, at its outer ends, and eye bolts 26 are arranged on the inner cleats 25, for co-engagement with locking hooks to be described. The end members 15 are provided with cleats 27 adjacent the ends thereof, and these cleats carry hooks 28, which lie in position for engagement with the eye bolts 26.

It will be seen that the side members 14 are first secured to the bottom 13 by means of the pins 22 and the locking plates 19, and the ends 15 are then placed between the cleats 24 and 25 on the sides 14, and held thereto, and to the sides 14 by means of the eye bolts 26 and their engaging hooks 28. The cleats 21 on the bottom 13, lying between the side members and outwardly of the end members, thus serve to prevent slipping of the side and end members. After assembling the parts described, the box may be packed as ordinarily. To complete the box the cover 16, which carries plates 27, similar to the plates 29 is secured to the side and end members by means of the plates and the pins 23 of the sides 14. The cover 16 has cleats 29 and 30 on its inner side, the cleat 29 being spaced inwardly from the end of the top and outwardly of the cleat 30, there are shown plates 31 which are similar to the plates 19 and 27.

To securely lock the box after its parts have been assembled, a locking cleat 32 is provided, and this cleat carries headed pins 33 for engagement with the plates 31, when it will lie in spaced relation to the cleat 29 and against the outer face of the adjacent end, thus holding the top against movement to disengage its plates from the pin 22. Screws or other suitable fastenings are provided for holding the cleat 32 in a locked position, and it may be stated, that a lock and key would effectively serve this purpose.

In the form of my invention shown in Fig. 7, a plate 18' having a T slot 20 is provided, and is thus arranged to receive a correspondingly shaped pin 32', shown in Fig. 8.

In the form of my invention shown in Figs. 9 and 10, plates 19 are provided and these plates have elongated slots 20, and these slots are transversed by the hooked ends 22'' of the plates 22.

It is understood that wherever the slotted plates 19, are mentioned, slotted strips reaching the whole or part of the length of the box may be used where the character of the box may make such strips preferable to plates.

In Figs. 12 to 14 I dispense with the hooks and the eyes, and upon the upper ends of the cleats 27, I provide outwardly extending headed studs, and upon the upper ends of the cleats 24 and 25 I provide plates. The plates 43 are slotted vertically as shown, and these slots are thus arranged to receive the headed studs 42.

From the foregoing description, it will be seen that a simple, strong and durable box is had, in which the sides and ends thereof are interchangeable, which will be found advantageous.

What is claimed is:

A knock-down crate having in combination, a bottom with locking plates along its longitudinal edges provided with key slots, a cleat skirting the two ends of said bottom, two similar sides having upper and lower headed pins for engaging within said locking plate, two spaced cleats secured near each end to each of said sides, eye bolts carried by said inner cleats, two similar end members provided with stop cleats near the opposite vertical edges, hooks secured to said stop cleats to engage said eye bolts, a lid having side and end locking plates to be engaged by the upper pins of said sides, a cleat skirting one end of said lid, a second cleat proximal to the opposite edge of said lid, and a locking cleat having projecting pins adapted to engage the end locking plates of said lid, all arranged as disclosed.

In testimony whereof I affix my signature, in presence of two witnesses.

JOHN B. NOYES.

Witnesses:
A. R. FLEMING,
J. P. REILY.